(12) United States Patent
Upton

(10) Patent No.: US 8,505,001 B2
(45) Date of Patent: Aug. 6, 2013

(54) METHOD AND SYSTEM FOR UTILIZING DATA FLOW GRAPHS TO COMPILE SHADERS

(75) Inventor: Eben Upton, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 337 days.

(21) Appl. No.: 12/868,192

(22) Filed: Aug. 25, 2010

(65) Prior Publication Data

US 2011/0154307 A1   Jun. 23, 2011

Related U.S. Application Data

(60) Provisional application No. 61/315,599, filed on Mar. 19, 2010.

(51) Int. Cl.
*G06F 9/45*   (2006.01)

(52) U.S. Cl.
USPC ........... 717/146; 717/148; 717/151; 717/155; 717/127; 345/620; 712/28

(58) Field of Classification Search
USPC ................. 717/146, 148, 151, 155; 345/620
See application file for complete search history.

(56) References Cited

U.S. PATENT DOCUMENTS

| | | | | |
|---|---|---|---|---|
| 5,532,714 | A * | 7/1996 | Knapp et al. | 345/634 |
| 7,530,062 | B2 * | 5/2009 | Aronson et al. | 717/159 |
| 8,044,951 | B1 * | 10/2011 | Brown et al. | 345/419 |
| 8,144,156 | B1 * | 3/2012 | Baldwin | 345/501 |
| 2006/0225061 | A1 * | 10/2006 | Ludwig et al. | 717/161 |
| 2009/0113402 | A1 * | 4/2009 | Chen et al. | 717/140 |
| 2011/0010715 | A1 * | 1/2011 | Papakipos et al. | 718/100 |
| 2012/0180030 | A1 * | 7/2012 | Crutchfield et al. | 717/149 |

* cited by examiner

*Primary Examiner* — Vanel Frenel
(74) *Attorney, Agent, or Firm* — Brinks Hofer Gilson & Lione

(57) ABSTRACT

A method and system are provided in which one or more processors may be operable to generate an intermediate representation of a shader source code, wherein the intermediate representation comprises one or more whole-program data flow graph representations of the shader source code. The one or more processors may be operable to generate machine code based on the generated intermediate representation of the shader source code. The one or more whole-program data flow graph representations of the shader source code may be generated utilizing a compiler front end. The machine code may be generated utilizing a compiler back end. The generated machine code may be executable by a graphics processor. The generated machine code may be executable by a processor comprising a single-instruction multiple-data (SIMD) architecture. The generated machine code may be executable to perform coordinate and/or vertex shading of image primitives.

20 Claims, 8 Drawing Sheets

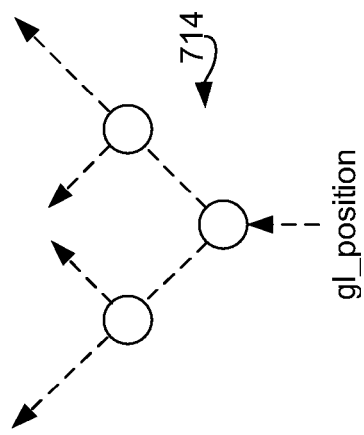
FIG. 7
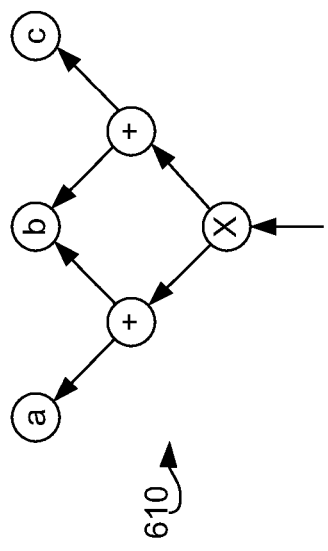
FIG. 6
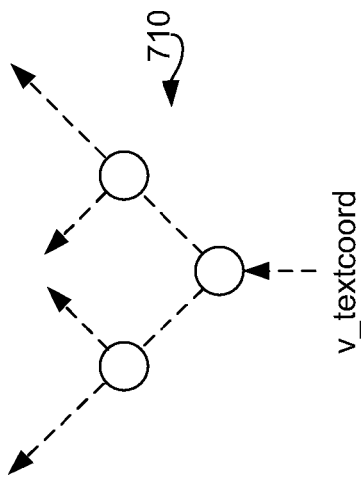

METHOD AND SYSTEM FOR UTILIZING DATA FLOW GRAPHS TO COMPILE SHADERS

CROSS-REFERENCE TO RELATED APPLICATIONS/INCORPORATION BY REFERENCE

This application makes reference to, claims priority to, and claims benefit of U.S. Provisional Application Ser. No. 61/315,599, filed Mar. 19, 2010.

This application also makes reference to:
U.S. Patent Application Ser. No. 61/287,269 which was filed on Dec. 17, 2009;
U.S. Patent Application Ser. No. 61/311,640 which was filed on Mar. 8, 2010;
U.S. Patent Application Ser. No. 61/328,541 which was filed on Apr. 27, 2010;
U.S. Patent Application Ser. No. 61/312,988 which was filed on Mar. 11, 2010;
U.S. Patent Application Ser. No. 61/321,244 which was filed on Apr. 6, 2010;
U.S. Patent Application Ser. No. 61/315,620 which was filed on Mar. 19, 2010;
U.S. Patent Application Ser. No. 61/315,637 which was filed on Mar. 19, 2010; and
U.S. Patent Application Ser. No. 61/326,849 which was filed on Apr. 22, 2010.

Each of the above stated applications is hereby incorporated herein by reference in its entirety.

FIELD OF THE INVENTION

Certain embodiments of the invention relate to communication systems. More specifically, certain embodiments of the invention relate to utilizing data flow graphs to compile shaders.

BACKGROUND OF THE INVENTION

Image and video capabilities may be incorporated into a wide range of devices such as, for example, cellular phones, personal digital assistants, digital televisions, digital direct broadcast systems, digital recording devices, gaming consoles and the like. Operating on video data, however, may be very computationally intensive because of the large amounts of data that need to be constantly moved around. This normally requires systems with powerful processors, hardware accelerators, and/or substantial memory, particularly when video encoding is required. Such systems may typically use large amounts of power, which may make them less than suitable for certain applications, such as mobile applications.

Due to the ever growing demand for image and video capabilities, there is a need for power-efficient, high-performance multimedia processors that may be used in a wide range of applications, including mobile applications. Such multimedia processors may support multiple operations including audio processing, image sensor processing, video recording, media playback, graphics, three-dimensional (3D) gaming, and/or other similar operations. Some of those operations may utilize complex software applications and/or algorithms that need to be compatible with the type of data intensive calculations performed by such multimedia processors.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for utilizing data flow graphs to compile shaders, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIGS. 6 and 7 are diagrams that illustrate data flow graphs to generate a coordinate shader for use in a tile mode renderer, in accordance with an embodiment of the invention.

DETAILED DESCRIPTION OF THE INVENTION

Certain embodiments of the invention can be found in a method and system for utilizing data flow graphs to compile shaders. In accordance with various embodiments of the invention, one or more processors may be utilized to generate an intermediate representation of a shader source code, wherein the intermediate representation comprises one or more whole-program data flow graph representations of the shader source code. The shader source code may comprise a vertex shader source code. The one or more processors may be utilized to generate machine code or assembler based on the generated intermediate representation of the shader source code. The one or more whole-program data flow graph representations of the shader source code may be generated utilizing a compiler front end. The intermediate representation may be an executable representation of the shader source code.

The machine code or assembler may be generated utilizing a compiler back end. The generated machine code may be executable by a processor comprising a single-instruction multiple-data (SIMD) architecture. The generated machine code may be executable by a graphics processor. The generated machine code may be executable by a graphics processor comprising a fixed-cycle-pipeline architecture. The generated machine code may be executable to perform vertex shading of image primitives. The generated machine code may be executable to perform coordinate shading of image primitives.

Figure 1A:
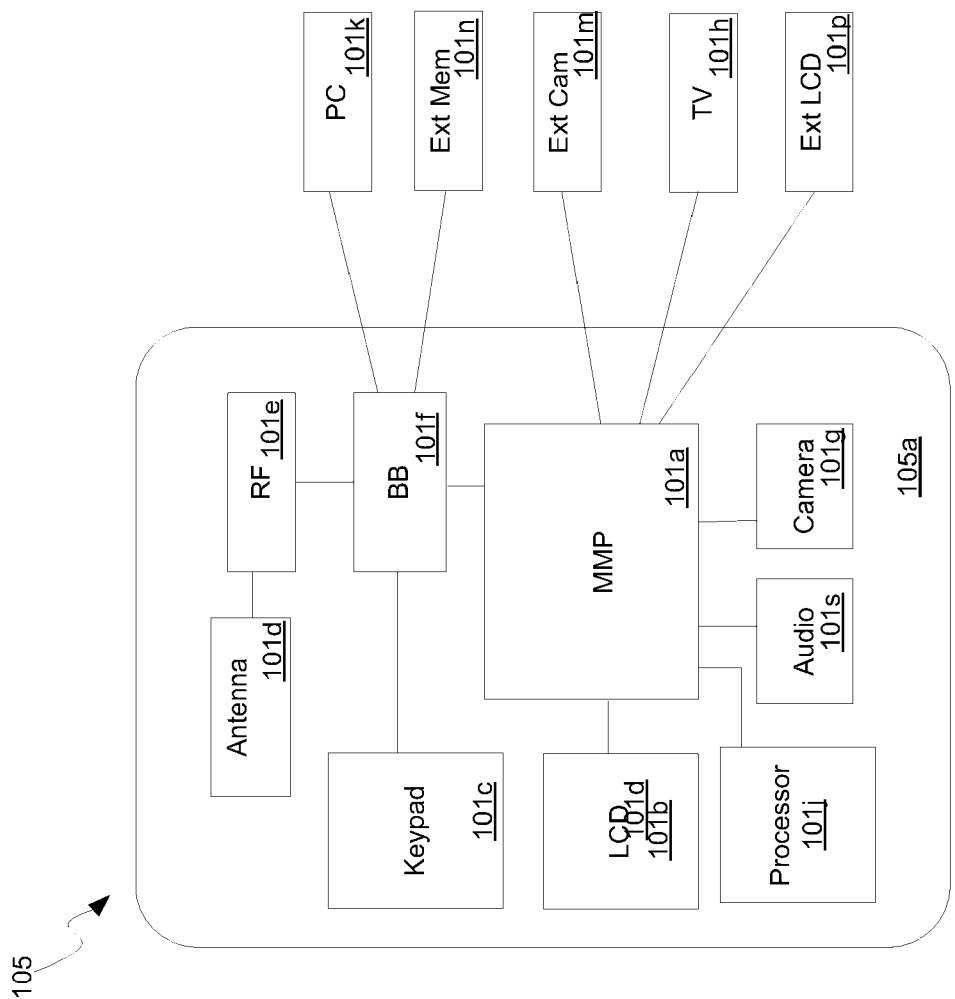
FIG. 1A is a block diagram of an exemplary multimedia system that is operable to render images utilizing a coordinate and/or a vertex shader, in accordance with an embodiment of the invention.

FIG. 1A is a block diagram of an exemplary multimedia system that is operable to render images utilizing a coordinate and/or a vertex shader, in accordance with an embodiment of the invention. Referring to FIG. 1A, there is shown a mobile multimedia system 105 that comprises a mobile multimedia device 105a, a television (TV) 101h, a personal computer (PC) 101k, an external camera 101m, external memory 101n, and external liquid crystal display (LCD) 101p. The mobile multimedia device 105a may be a cellular telephone or other handheld communication device. The mobile multimedia device 105a may comprise a mobile multimedia processor (MMP) 101a, an antenna 101d, an audio block 101s, a radio frequency (RF) block 101e, a baseband processing block 101f, an LCD 101b, a keypad 101c, and a camera 101g.

The MMP 101a may comprise suitable circuitry, logic, interfaces, and/or code that may be operable to perform video and/or multimedia processing for the mobile multimedia device 105a. The MMP 101a may also comprise integrated interfaces, which may be utilized to support one or more external devices coupled to the mobile multimedia device 105a. For example, the MMP 101a may support connections to a TV 101h, an external camera 101m, and an external LCD 101p.

The processor 101j may comprise suitable circuitry, logic, interfaces, and/or code that may be operable to control processes in the mobile multimedia system 105. Although not shown in FIG. 1A, the processor 101j may be coupled to a plurality of devices in and/or coupled to the mobile multimedia system 105.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video data may be received from the external camera 101m, and image data may be received via the integrated camera 101g. During processing, the MMP 101a may utilize the external memory 101n for storing of processed data. Processed audio data may be communicated to the audio block 101s and processed video data may be communicated to the LCD 101b and/or the external LCD 101p, for example. The keypad 101c may be utilized for communicating processing commands and/or other data, which may be required for audio or video data processing by the MMP 101a.

In an embodiment of the invention, the MMP 101A may be operable to perform three-dimensional (3D) pipeline processing of video signals. More particularly, the MMP 101A may be operable to perform tile mode rendering in two separate phases, a first phase comprising a binning process or operation and a second phase comprising a rendering process or operation. The MMP 101a may process video signals within a plurality of video modules, as described further with respect to FIG. 1B.

Some video processing operations supported by the MMP 101A, such as 3D pipeline processing of video signals, for example, may require the use of shader programs such as coordinate and/or vertex shaders. Coordinate shaders may be utilized in the first phase of the tile mode rendering, while vertex shaders may be utilized in the second phase of the tile mode rendering. Shader programs may be compiled into machine code or assembler for use by the MMP 101A from shader source code by utilizing data flow graphs, such as whole-program data flow graphs, for example, to represent the various dependencies of the shader source code.

Figure 1B:
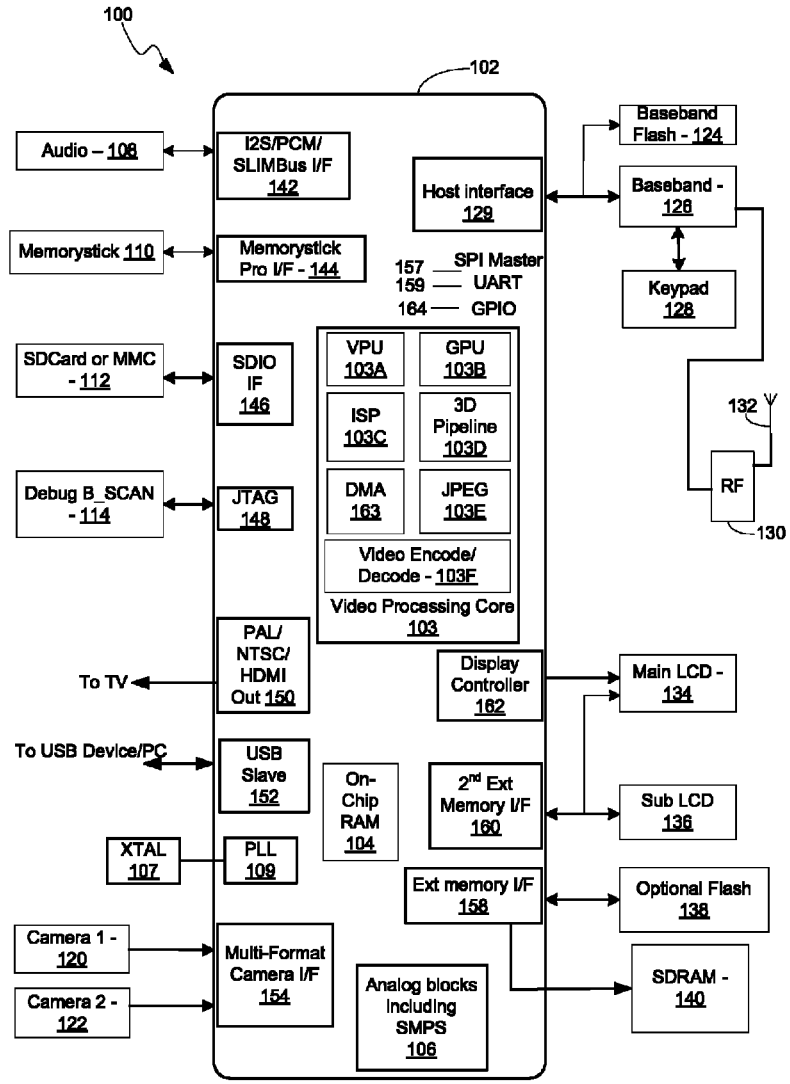
FIG. 1B is a block diagram of an exemplary multimedia processor that is operable to render images utilizing a coordinate and/or a vertex shader, in accordance with an embodiment of the invention.

FIG. 1B is a block diagram of an exemplary multimedia processor that is operable to render images utilizing a coordinate and/or a vertex shader, in accordance with an embodiment of the invention. Referring to FIG. 1B, the mobile multimedia processor 102 may comprise suitable logic, circuitry, interfaces, and/or code that may be operable to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103 that may comprise a video processing unit (VPU) 103A, a graphic processing unit (GPU) 103B, an image sensor pipeline (ISP) 103C, a 3D pipeline 103D, a direct memory access (DMA) controller 163, a Joint Photographic Experts Group (JPEG) encoding/decoding module 103E, and a video encoding/decoding module 103F. The mobile multimedia processor 102 may also comprise on-chip RAM 104, an analog block 106, a phase-locked loop (PLL) 109, an audio interface (I/F) 142, a memory stick I/F 144, a Secure Digital input/output (SDIO) I/F 146, a Joint Test Action Group (JTAG) I/F 148, a TV output I/F 150, a Universal Serial Bus (USB) I/F 152, a camera I/F 154, and a host I/F 129. The mobile multimedia processor 102 may further comprise a serial peripheral interface (SPI) 157, a universal asynchronous receiver/transmitter (UART) I/F 159, a general purpose input/output (GPIO) pins 164, a display controller 162, an external memory I/F 158, and a second external memory I/F 160.

The video processing core 103 may comprise suitable logic, circuitry, interfaces, and/or code that may be operable to perform video processing of data. The on-chip Random Access Memory (RAM) 104 and the Synchronous Dynamic RAM (SDRAM) 140 comprise suitable logic, circuitry and/or code that may be adapted to store data such as image or video data.

The image sensor pipeline (ISP) 103C may comprise suitable circuitry, logic and/or code that may be operable to process image data. The ISP 103C may perform a plurality of processing techniques comprising filtering, demosaic, lens shading correction, defective pixel correction, white balance, image compensation, Bayer interpolation, color transformation, and post filtering, for example. The processing of image data may be performed on variable sized tiles, reducing the memory requirements of the ISP 103C processes.

The GPU 103B may comprise suitable logic, circuitry, interfaces, and/or code that may be operable to offload graphics rendering from a general processor, such as the processor 101j, described with respect to FIG. 1A. The GPU 103B may be operable to perform mathematical operations specific to graphics processing, such as texture mapping and rendering polygons, for example.

The 3D pipeline 103D may comprise suitable circuitry, logic and/or code that may enable the rendering of 2D and 3D graphics. The 3D pipeline 103D may perform a plurality of processing techniques comprising vertex processing, rasterizing, early-Z culling, interpolation, texture lookups, pixel shading, depth test, stencil operations and color blend, for example.

The 3D pipeline 103D may support OpenGL-ES 2.0, OpenGL-ES 1.1, and OpenVG 1.1, for example. The 3D pipeline 103D may comprise a multi-core programmable pixel shader, for example. The 3D pipeline 103D may be operable to handle 32 M triangles-per-second (16 M rendered triangles-per-second), for example. The 3D pipeline 103D may be operable to handle 1 G rendered pixels-per-second with Gouraud shading and one bi-linear filtered texture, for example. The 3D pipeline 103D may support four times (4×) full-screen anti-aliasing at full pixel rate, for example.

The 3D pipeline 103D may comprise a tile mode architecture in which a rendering operation may be separated into a first phase comprising a binning process or operation and a second phase comprising a rendering process or operation. During the first phase, the 3D pipeline 103D may utilize a coordinate shader to perform a binning operation. The coordinate shader may be obtained from a vertex shader at compile time, for example. In one embodiment of the invention, the coordinate shader may be obtained automatically during vertex shader compilation. The coordinate shader may comprise those portions of the vertex shader that relate to the processing of the coordinates of the vertices. Such coordinates may be utilized to, for example, control the binning operation and need not be stored for subsequent use such as during the second phase, for example.

During the second phase, the 3D pipeline 103D may utilize a vertex shader to render images such as those in frames in a video sequence, for example. A vertex shader may be typically utilized to transform a 3D position of a vertex from a graphics primitive such as triangles or polygons, for example, in a virtual space to a corresponding two-dimensional (2D) coordinate at on a screen plane. A vertex shader may also be utilized to obtain a depth value for a Z-buffer for a vertex. A vertex shader may process various vertex properties such as color, position, and/or texture coordinates. The output of a vertex shader may be utilized by a geometry shader and/or a rasterizer, for example. Because the coordinate shader utilized in the first phase need not generate a complete set of vertex properties that may be produced by a typical full vertex shader, those values need not be stored for later use. Accordingly, this may result in reduced memory and/or bandwidth requirements.

Although not shown in FIG. 1B, the 3D pipeline 103D may comprise a plurality of processors, each comprising suitable logic, circuitry, interfaces and/or code that may be operable to perform tile-based rendering operations. Each processor may comprise a special purpose floating-point shader processor. In one embodiment of the invention, a processor may comprise a fixed-cycle pipeline structure, such as a 3-cycle-pipeline structure, for example. In various embodiments of the invention, processor may comprise a 16-way single instruction multiple data (SIMD) processor that may be operable to process streams of pixels. Notwithstanding, the invention need not be limited in this regard.

The JPEG module 103E may comprise suitable logic, circuitry, interfaces, and/or code that may be operable to encode and/or decode JPEG images. JPEG processing may enable compressed storage of images without significant reduction in quality.

The video encoding/decoding module 103F may comprise suitable logic, circuitry, interfaces, and/or code that may be operable to encode and/or decode images, such as generating full 108p HD video from H.264 compressed data, for example. In addition, the video encoding/decoding module 103F may be operable to generate standard definition (SD) output signals, such as phase alternating line (PAL) and/or national television system committee (NTSC) formats.

Also shown in FIG. 1B are an audio block 108 that may be coupled to the audio interface I/F 142, a memory stick 110 that may be coupled to the memory stick I/F 144, an SD card block 112 that may be coupled to the SDIO IF 146, and a debug block 114 that may be coupled to the JTAG I/F 148. The PAL/NTSC/high definition multimedia interface (HDMI) TV output I/F 150 may be utilized for communication with a TV, and the USB 1.1, or other variant thereof, slave port I/F 152 may be utilized for communications with a PC, for example. A crystal oscillator (XTAL) 107 may be coupled to the PLL 109. Moreover, cameras 120 and/or 122 may be coupled to the camera I/F 154.

Moreover, FIG. 1B shows a baseband processing block 126 that may be coupled to the host interface 129, a radio frequency (RF) processing block 130 coupled to the baseband processing block 126 and an antenna 132, a basedband flash 124 that may be coupled to the host interface 129, and a keypad 128 coupled to the baseband processing block 126. A main LCD 134 may be coupled to the mobile multimedia processor 102 via the display controller 162 and/or via the second external memory interface 160, for example, and a subsidiary LCD 136 may also be coupled to the mobile multimedia processor 102 via the second external memory interface 160, for example. Moreover, an optional flash memory 138 and/or an SDRAM 140 may be coupled to the external memory I/F 158.

In operation, the mobile multimedia processor 102 may perform tile mode rendering utilizing the two separate phases described above. The first phase may be performed, at least in part, by the coordinate shader operating or executing in, for example, the 3D pipeline 103D. The coordinate shader may be compiled from a shader source code, such as a vertex shader source code, for example, by utilizing data flow graphs, such as whole-program data flow graphs, for example, to represent the various dependencies associated with coordinate shading in the vertex shader source code. During the first or binning phase, it may be determined which pixel tiles in a screen plane are covered or overlapped by each graphic primitive associated with a video frame, for example. During this phase, an ordered list of primitives and/or state-change data for each tile may be built. The list or lists generated during the binning phase may comprise indices, for example vertex indices, which make reference to a table that comprises attributes of the vertices of the primitives. In some embodiments of the invention, the indices in the list or lists may be compressed.

The second phase may be performed, at least in part, by the vertex shader operating or executing in, for example, the 3D pipeline 103D. The vertex shader may be compiled from the vertex source code from which the coordinate shader is compiled, for example. The vertex shader may be compiled by utilizing data flow graphs, such as whole-program data flow graphs, for example, to represent the various dependencies associated with vertex shading in the vertex shader source code. During the second or rendering phase, the contents associated with each pixel tile may be drawn or rendered. The rendering phase may utilize the list or lists generated during the binning phase that provide a reference to the vertex attributes of the primitives located within the tile. The vertex attributes may be brought into local memory on a tile-by-tile basis, for example. Once a pixel tile is rendered, the rendered pixels may be pushed to main memory, for example, and a similar approach may be followed with other pixel tiles.

Figure 2A:
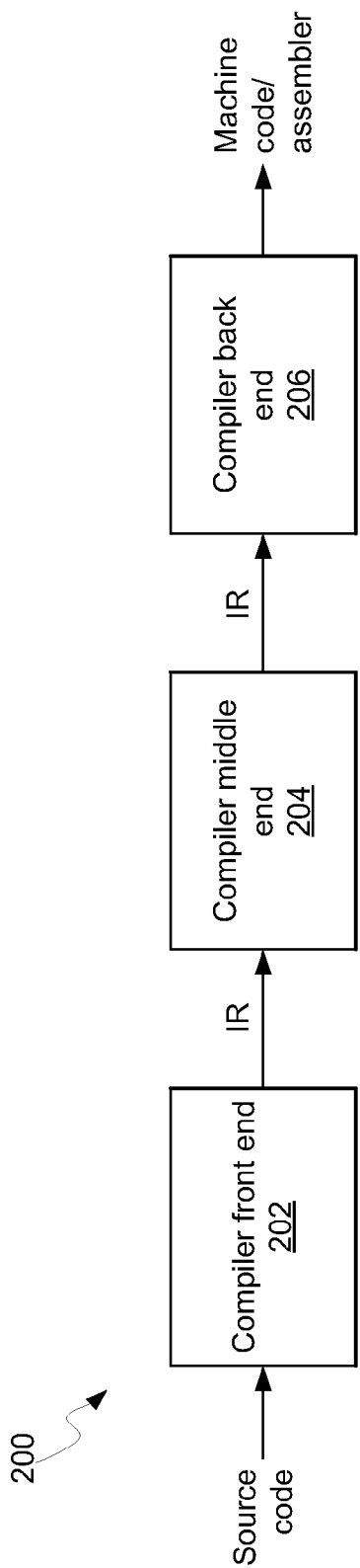
FIG. 2A is a block diagram that illustrates a compiler architecture, in connection with an embodiment of the invention.

FIG. 2A is a block diagram that illustrates a compiler architecture, in connection with an embodiment of the invention. Referring to FIG. 2A, there is shown a compiler architecture 200 that comprises a compiler front end 202, a compiler middle end 204, and a compiler back end 206. The compiler architecture 200 may represent a typical compiler architecture for compiling source code into machine code or assembler, for example.

The compiler front end 202 may comprise suitable code to perform a plurality of functions such as lexical analysis and/or parsing of source code, for example. The compiler front end 202 may generate an intermediate representation (IR) or intermediate code of the source code that may be sent to the compiler middle end 204. Intermediate representation or intermediate code may be generated to aid in optimization of the code operation. An example of intermediate representation or intermediate code comprises the use of three-address code (TAO or 3AC). Each instruction in 3AC may be described as a 4-tuple comprising an operator, a first operand, a second operand, and a result. For example, the instruction "add r6, r12, r52" represents an addition of the contents in registers r6 and r12 with the result being placed in register r52.

The compiler middle end 204 may comprise suitable code to perform optimization operations on the IR received from the compiler front end 202. The compiler middle end 204 may also generate an IR that may be sent to the compiler back end 206. The compiler back end 206 may comprise suitable code to perform machine code or assembler generation from the IR received from the compiler middle end 204. The compiler back end 206 may also perform optimization operations on the IR received from the compiler middle end 204.

The compiler architecture 200 may enable combining of different compiler ends for particular compiling needs. When the compiler middle end 204 is designed such that it is effective in optimizing intermediate representations, such compiler middle end 204 may be used with any one of a plurality of compiler front ends 202 and/or with any one of a plurality of compiler back ends 206. For example, a compiler front end that is configured to generate IR from Fortran source code may be used with the compiler middle end 204. The optimized IR may then be sent to a compiler back end 206 that may be configured to generate machine code for x86-based hardware. Similarly, in another example, a compiler front end 202 that may be configured to generate IR from C source code may also be used with the compiler middle end 204. The optimized IR may then be sent to a compiler back end 206 that may be configured to generate machine code for PowerPC-based hardware.

Figure 2B:
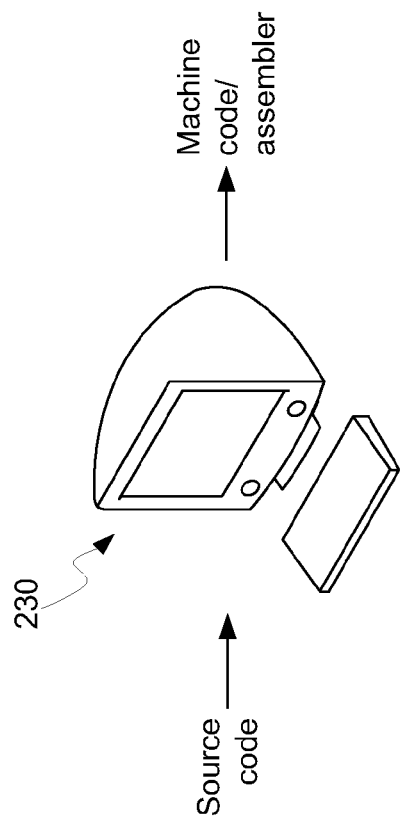
FIG. 2B is a block diagram that illustrates a system for compiling source code utilizing the compiler architecture of FIG. 2A, in connection with an embodiment of the invention.

FIG. 2B is a block diagram that illustrates a system for compiling source code utilizing the compiler architecture of FIG. 2A, in connection with an embodiment of the invention. Referring to FIG. 2B, there is shown a system 230 that may comprise suitable logic, circuitry, code, and/or interfaces that may be operable to run or execute a compiler, such as a compiler associated with the compiler architecture 200, for example, to compile source code into machine code or assembler. Although not shown in FIG. 2A, the system 230 may comprise one or more processors that may be operable to compile the source code into machine code or assembler. The system 230 may be operable to compile source code from a plurality of different programming languages into machine code or assembler compatible with a plurality of processor architectures. That is, the system 230 may be programmable and may be operable to run or execute a plurality of compiler ends such that source code from a plurality of languages may be compiled into machine code or assembler for a plurality of processor architectures.

Figure 2C:
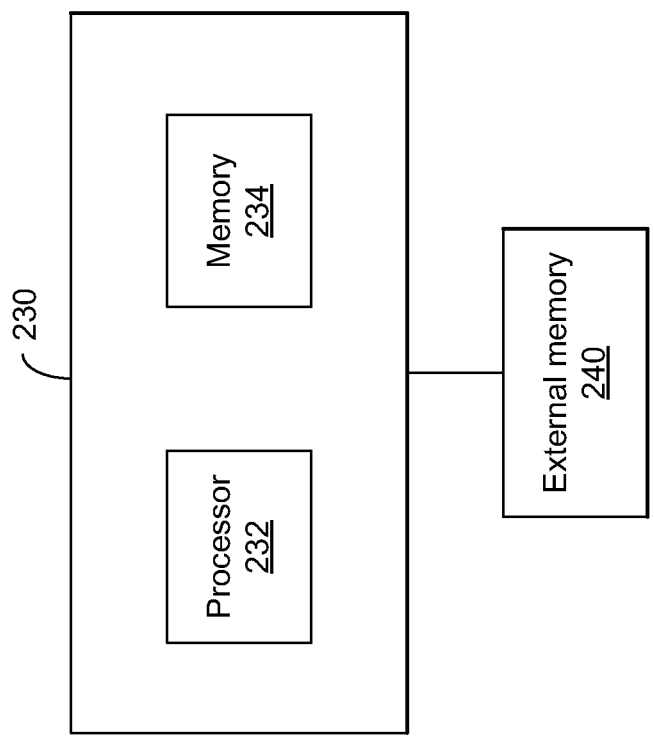
FIG. 2C is a block diagram that illustrates the system for compiling source code of FIG. 2B, in connection with an embodiment of the invention.

FIG. 2C is a block diagram that illustrates the system for compiling source code of FIG. 2B, in connection with an embodiment of the invention. Referring to FIG. 2C, there is shown the system 230, which may comprise a processor 232 and a memory 234. The processor 232 may comprise suitable logic, circuitry, code, and/or interfaces that may be operable to compile source code utilizing a compiler with a compiler architecture substantially similar to the compiler architecture 200, for example. The compiled code may be in the form of machine code or assembler, for example. In some embodiments of the invention, IR or intermediate code may be generated by the processor 232 when compiling source code. The processor 232 may be, for example, a central processing unit (CPU) or other like device. In some embodiments of the invention, the processor 232 may comprise a plurality of processors.

The memory 234 may comprise suitable logic, circuitry, code, and/or interfaces that may be operable to store one or both of the compiler and the compiled code. For example, the compiler, or at least a portion of the compiler, may be stored in the memory 234 and may be accessed by the processor 232 for execution. The output code generated by the compiler, such as IR, machine code, and/or assembler, may also be stored in the memory 234.

The external memory 240 may comprise suitable logic, circuitry, code, and/or interfaces that may be operable to store one or both of the compiler and the compiled code. For example, the compiler may be received by the system 230 from the external memory 240. Moreover, the compiled code may be stored in the external memory 240. The external memory 240 may be a removable memory, for example, and may be utilized to transfer the compiled code to another device. In some embodiments of the invention, the external memory 240 may be, for example, a non-transitory computer readable medium and/or storage medium, and/or a non-transitory machine readable medium and/or storage medium.

The typical compiler architecture 200 described above with respect to FIG. 2A, however, may have some limitations in certain applications. For example, the use of 3AC as IR comprises having a large number of statements or sequences of commands in a particular order in which some of the ordering information may be important and some may not be. Because optimization comprises looking for ways to move instructions around, eliminate instructions, replace instructions with computationally cheaper instructions, and/or move instructions to places in which they are executed less often, for example, a large amount of time and/or effort may be needed to optimize a large number of 3AC statements. As a result, performing a dependency analysis as part of the optimization operation may be necessary.

At the start of the optimization operation in the compiler middle end 204, a significant amount of time and/or effort may be spent generating or building dependency structures that describe the dependency relationships between various expressions in the IR. Once the dependency structures are determined, a first optimization pass may be performed by manipulating instructions in the manner described above. Part of the optimization process may comprise fixing any broken dependencies that may exist in the dependency structures. After the first optimization process is completed, the dependency structures may be updated. This process may be iterated until a determined level of optimization or performance is achieved. Because of its complexity, the compiler middle end 204 may be, in many instances, the most expensive portion of the compiler architecture 200.

Such optimization considerations are not limited to the compiler middle end 204. When the compiler back end 206 receives the list of instructions from the compiler middle end 204, the compiler back end 206 may determine whether modifying the order of the instructions may make the resulting machine code more efficient.

In one embodiment of the invention, the dependency structures are designed such that the dependency structures are themselves an executable representation of the source code, the compiler architecture may be simplified and the compiler middle end may be removed or bypassed. That is, by properly designing the dependency structures, the dependency structures may be used as the IR or intermediate code of the source code.

The following example is shown to illustrate the use of data flow graphs as a dependency structure that they may be an executable representation of the source code. A small portion of source code is shown below for this purpose:

```
if (C < D) {
    A = 6;
} else {
    A = 7;
}
``` where if the predicate (C<D) is true, the value of A is 6, otherwise the value of A is 7. The source code may be converted into the following piece of machine code:

```
comp         C D
blt          truelabel
             bra falselabel
truelabel:   mov A, 6
falselabel:  mov A, 7
``` where the comp operator compares the values of C and D, the blt operator branches to truelabel if C is less than D and to falselabel if C is not less than D, and the mov operator places the value of the operand, for example, 6 or 7, in the register associated with A.

Figure 3:
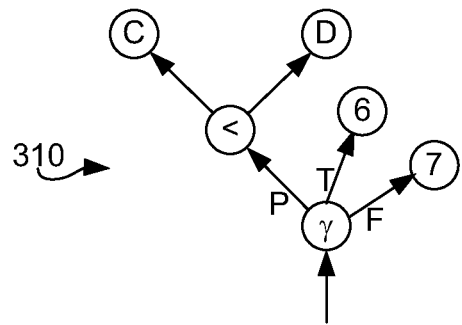
FIG. 3 illustrates an example of a data flow graph representation, in accordance with an embodiment of the invention.

FIG. 3 illustrates a data flow graph representation of the source code and the machine code in the above example, in accordance with an embodiment of the invention. Referring to FIG. 3, there is shown data flow graph 310, which corresponds to a dependency representation of the source code and the machine code shown above. In the data flow graph 310, the Gamma (γ) node is a base multiplexing node for the collection of branches in the data flow graph 310. When the Gamma node is pulled, it first pulls on the predicate (C<D), and depending on whether the predicate is true (T) or false (F), the Gamma node then pulls on the value 6 or on the value 7, accordingly. The data flow graph 310 may be an executable representation of the source code and the machine code in the above example, and may be used as IR or intermediate code for such example.

In some instances, however, data flow graphs may not be a form of dependency structure that may be suitable for use as an IR. For example, data flow graphs may not be suitable as an IR of source code in which at least a portion of the source code has some form of control flow. In those instances, it may be very difficult to optimize a control flow program, such as a C program, for example, by having such program represented by one or more data flow graphs in the same manner as the data flow graph representation shown in FIG. 3.

Figure 4:
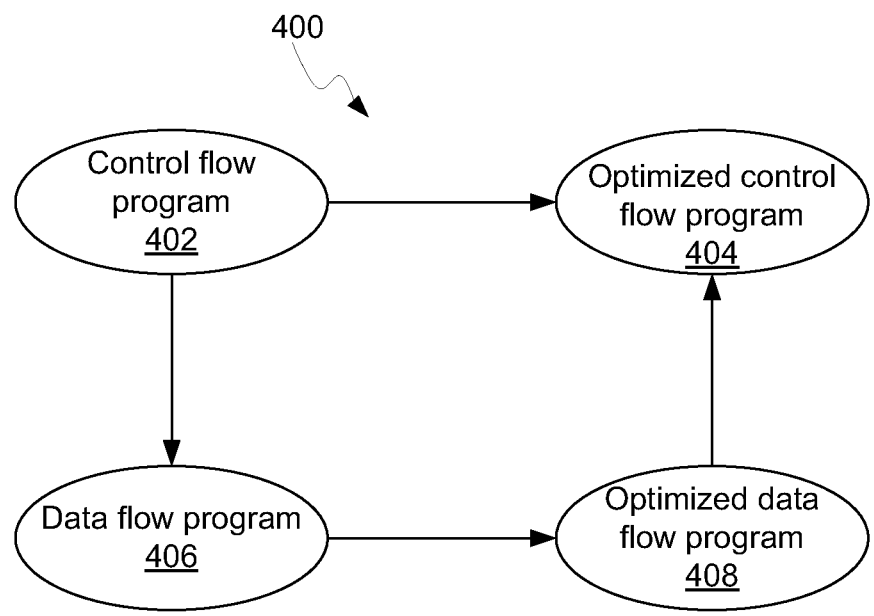
FIG. 4 is a flow chart illustrating control flow program and data flow program optimization paths, in connection with an embodiment of the invention.

FIG. 4 is a flow chart illustrating control flow program and data flow program optimization paths, in connection with an embodiment of the invention. Referring to FIG. 4, there is shown a flow chart 400. In step 402, a control flow program, such as a C program or an assembler program, for example, may be received. The control flow program may be optimized as shown in step 404. The optimization process associated with the control flow program, however, may be hard and expensive.

The control flow program in step 402 may be converted to a data flow program as shown in step 406 by, for example, removing ordering constraints, that is, by removing control flow information. In some instances, the conversion of a control flow program to a data flow program may be fairly simple and inexpensive to do. The data flow program in step 406 may be optimized as shown in step 408. Since the data flow program need not be limited by ordering constraints as is the case for the control flow program, the optimization process for the data flow program may be very easy, and in some instances, it may be trivial.

Converting the optimized data flow program in step 408 to an optimized control flow program such as the optimized control flow program in step 404 may be very hard to achieve because of the task of building back up the control flow. Consequently, the use of data flow graphs as intermediate representation of control flow programs may be limited because the control flow information, such as ordering constraints, for example, is still needed to optimize the control flow program.

Shader programs, such as those used for coordinate and/or vertex shading during tile-mode rendering operations, are configured to provide a high-degree of parallelism to process large amounts of data, for example. These programs may be designed to operate in SIMD processors such that the processing path of each vertex in the program, for example, is the same. In other words, to achieve a high-degree of parallelism, the processing of different vertices may not be such that different paths in a program are taken. By removing logic flow from shader programs to achieve a high-degree of parallelism, shader programs may be implemented as data flow programs and can have a dependency structured that is based on data flow graphs.

The following example is shown to illustrate that a portion of a shader program or shader source code can be modified such that a high-degree of parallelism may be achieved. A small portion of a shader source code is shown below:

```
if (P) {
    A = B + C;
} else {
    A = B*C;
}
``` where if the predicate P is true, the value of A is B+C, otherwise the value of A is B*C. The shader source code may be transformed in the following manner:

```
A1 = B + C;
A2 = B*C;
A = P? A1:A2
``` where the ? operator assigns the value A1=B+C to A when the predicate P is true, otherwise assigns the value A2=B*C. In this manner, whether the predicate P is true or false, the program path can be the same for any vertex being processed. While this may be inefficient for scalar operations or for processing a single vertex, when a large number of vertices are being processed, this approach ensures that each vertex is being processed the same way to take advantage of the parallel processing architecture.

For data flow graphing to be effectively used in shader program compilation, whether it be a coordinate shader program and/or a vertex shader program, whole-program data flow graph representation may be necessary because of the enforced lack of control flow of the output program in such representation.

Figure 5A:
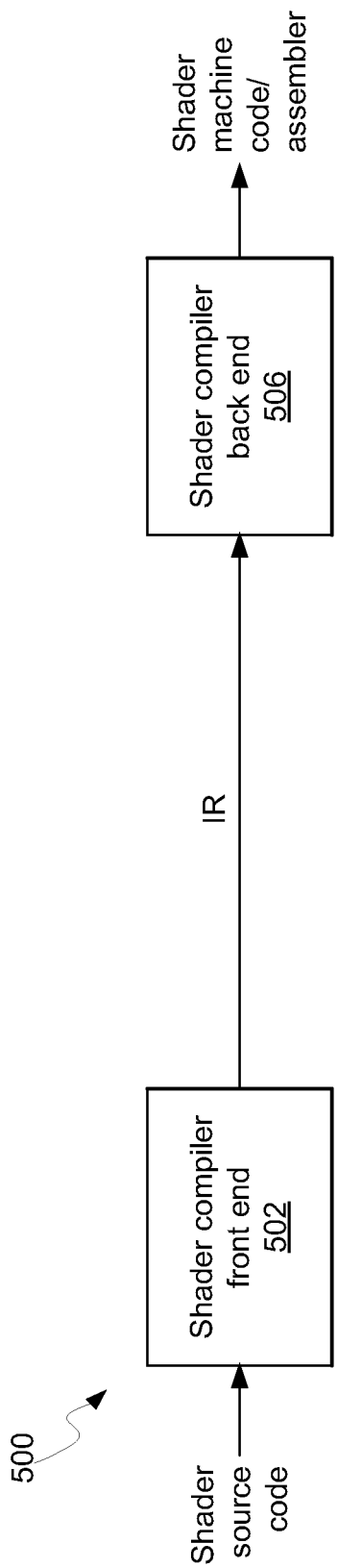
FIG. 5A is a block diagram that illustrates a shader compiler architecture, in accordance with an embodiment of the invention.

FIG. 5A is a block diagram that illustrates a shader compiler architecture, in accordance with an embodiment of the invention. Referring to FIG. 5A, there is shown a shader compiler architecture 500 that comprises a shader compiler front end 502 and a shader compiler back end 506. The compiler architecture 200 may represent a shader compiler architecture for compiling shader source code into machine code or assembler, for example.

The shader compiler front end 502 may comprise suitable code to perform a plurality of functions such as lexical analysis and/or parsing of source code, for example. The shader compiler front end 502 may generate an IR or intermediate code of the shader source code that may be sent to the shader compiler back end 506. Since the shader source code may be configured as a data flow program without the need for control flow information, the IR or intermediate code generated by the shader compiler front end 502 may comprise whole-program data flow graphs as dependency structures representative of the shader program source code. In this regard, the IR generated by the shader compiler front end 502 may be executable and may be easily optimized. As a result, the compiler architecture 500 need not comprise a compiler middle end as that of the compiler architecture 200 described above with respect to FIG. 2A.

The shader compiler back end 506 may comprise suitable code to perform machine code or assembler generation from the IR received from the shader compiler front end 502. The shader compiler back end 506 may perform optimization operations on the IR received from the shader compiler front end 502.

Figure 5B:
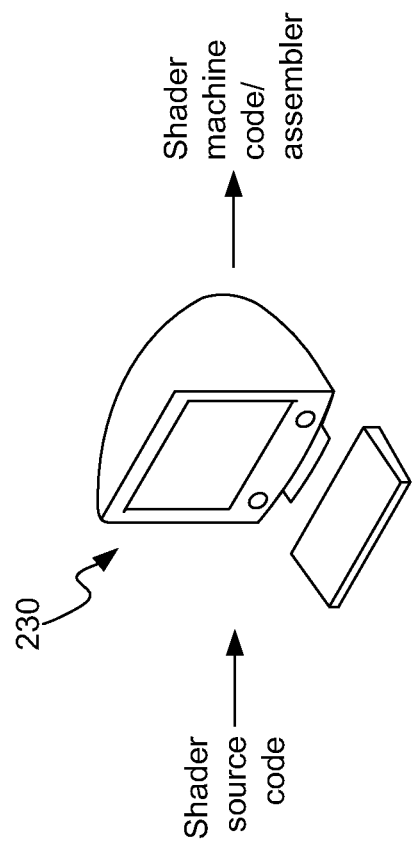
FIG. 5B is a block diagram that illustrates a system for compiling shader source code utilizing the shader compiler architecture of FIG. 5A, in accordance with an embodiment of the invention.

FIG. 5B is a block diagram that illustrates a system for compiling shader source code utilizing the shader compiler architecture of FIG. 5A, in accordance with an embodiment of the invention. Referring to FIG. 5B, there is shown the system 230 described above with respect to FIG. 2B, which may be operable to run or execute a compiler, such as a compiler associated with the shader compiler architecture 500, to compile shader source code into machine code or assembler. The system 230 may be operable to compile shader source code from a plurality of different programming languages into machine code or assembler compatible with a plurality of processor architectures. That is, the system 230 may be programmable and may be operable to run or execute a plurality of compiler ends such that shader source code from a plurality of languages may be compiled into machine code or assembler for a plurality of processor architectures.

Referring back to FIG. 2C, the processor 232 in the system 230 may be operable to compile shader source code utilizing a shader compiler with a shader compiler architecture substantially similar to the shader compiler architecture 500, for example. The compiled shader code may be in the form of machine code or assembler, for example. In some embodiments of the invention, IR or intermediate code may be generated by the processor 232 when compiling shader source code.

The memory 234 may be operable to store one or both of the shader compiler and the compiled shader code. For example, the shader compiler, or at least a portion of the shader compiler, may be stored in the memory 234 and may be accessed by the processor 232 for execution. The output code generated by the shader compiler, such as IR, machine code, and/or assembler, may also be stored in the memory 234.

The external memory 240 may be operable to store one or both of the shader compiler and the compiled shader code. For example, the shader compiler may be received by the system 230 from the external memory 240. Moreover, the compiled shader code may be stored in the external memory 240. The external memory 240 may be a removable memory, for example, and may be utilized to transfer the compiled shader code to another device. In this regard, the compiled shader code may be utilized with the mobile multimedia processor 101a described above with respect to FIG. 1A and/or with the mobile multimedia processor 102 described above with respect to FIG. 1B.

FIGS. 6 and 7 are diagrams that illustrate data flow graphs to generate a coordinate shader for use in a tile mode renderer, in accordance with an embodiment of the invention. Regarding FIG. 6, there is shown a data dependence or data flow graph 610 that represents the operation (a+b)*(b+c). The data flow graph 610 may comprise a root node from which the operation may be pulled during compilation. A data flow graph representation of an operation or of multiple operations may be suitable for the type of architecture embodiments described above with respect to the 3D pipeline 103D, for example. In some embodiments of the invention, the source code from which the coordinate shader and/or the vertex shader may be compiled may be represented as whole-program data flow graphs.

Regarding FIG. 7, there is shown a graphical representation of a vertex shader source code. The vertex shader source code may comprise a whole-program data flow graph representation with a data flow graph 710 associated with texture operations (v_textcoord), a data flow graph 712 (v_lighting) associated with lighting operations, and a data flow graph 714 (gL_position) associated with positional operations such as transformations and/or projections, for example. Each of the data flow graphs 710, 712, and 714 may comprise a root node from which the respective operations may be pulled during compilation. The vertex shader may be obtained by compiling the vertex shader source code. Moreover, the coordinate shader may be obtained from the vertex shader source code at compile time by slicing the portion of the vertex shader source code associated with the operations of the coordinate shader. In some instances, the coordinate shader may be obtained automatically from the vertex shader at compile time.

The data flow graph 710 in FIG. 7, in which a whole-program data flow graph representation of a vertex shader source code may be sliced to generate the coordinate shader at compile time, is given by way of example and not of limitation. In this regard, program slicing refers to computing or determining a set of statements from the program or source code that affect the values of the program at a point of interest. Program slicing may be static or dynamic. In static program slicing, the program slice may comprise the statements in a program that may affect the value of a particular variable at a certain point in the program. Dynamic program slicing refers to a specific execution of program, that is, the program slice may comprise the statements in the program that actually affect the value of particular variable at a certain point in the program with a given set of program inputs. Program slicing may also be utilized in control flow representations of the vertex shader source code to generate the coordinate shader.

Figure 8:
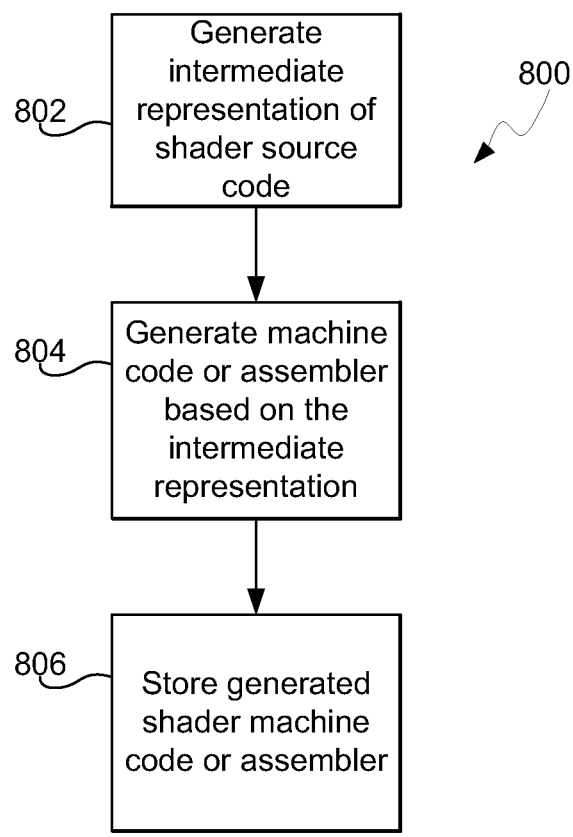
FIG. 8 is a flow chart that illustrates an exemplary compilation of a shader machine code or assembler from a shader source code, in accordance with an embodiment of the invention.

FIG. 8 is a flow chart that illustrates an exemplary compilation of a shader machine code or assembler from a shader source code, in accordance with an embodiment of the invention. Referring to FIG. 8, there is shown a flow graph 800. In step 802, one or more processors in the system 230, such as the processor 232, for example, may be utilized to generate an intermediate representation of a shader source code, wherein the intermediate representation comprises one or more whole-program data flow graph representations of the shader source code. The shader source code may be a vertex shader source code, for example. The one or more whole-program data flow graph representations of the shader source code may be generated by the one or more processors in the system 230 utilizing a compiler front end, such as the shader compiler front end 502, for example, described above with respect to FIG. 5A. The intermediate representation may be an executable representation of the shader source code.

In step 804, the one or more processors in the system 230 may be utilized to generate machine code based on the intermediate representation of the shader source code generated in step 802. The machine code generated in step 804 may be executable in a processor comprising a SIMD architecture, a graphics processor, and/or a graphics processor comprising a fixed-cycle-pipeline architecture. The machine code generated in step 804 may be executable to perform vertex shading of image primitives and/or coordinate shading of image primitives. The machine code generated in step 804 may be generated utilizing a compiler back end, such as the shader compiler back end 506, for example, described above with respect to FIG. 5A.

In step 806, the machine code generated in step 804 may be stored in memory, such as the memory 234 and/or the external memory 240 described above with respect to FIG. 2C. The machine code may be stored in, for example, a non-transitory computer readable medium and/or storage medium, and/or a non-transitory machine readable medium and/or storage medium.

In some embodiments of the invention, the coordinate shader and/or the vertex shader may be compiled to be programmed into processors such as digital signal processors (DSPs), for example, and/or programmable hardware devices, for example. In other embodiments of the invention, the coordinate shader and/or the vertex shader may be compiled from source code described using a hardware-based programming language such that the compilation may be utilized to generate or configure an integrated circuit such as an application specific integrated circuit (ASIC) and/or a programmable device such as a field programmable gate array (FPGA), for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing data flow graphs for compiling shaders.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for code processing, the method comprising: performing by one or more processors:
generating an intermediate representation of a shader source code, wherein said intermediate representation comprises one or more whole-program data flow graph representations of said shader source code; and
generating in said one or more processors, machine code based on said generated intermediate representation of said shader source code.

2. The method according to claim 1, comprising generating said one or more whole-program data flow graph representations of said shader source code utilizing a compiler front end.

3. The method according to claim 1, wherein said generated machine code is executable by a processor comprising a single-instruction multiple-data (SIMD) architecture.

4. The method according to claim 1, wherein said generated machine code is executable by a graphics processor.

5. The method according to claim 1, wherein said generated machine code is executable by a graphics processor comprising a fixed-cycle-pipeline architecture.

6. The method according to claim 1, wherein said generated machine code is executable to perform vertex shading of image primitives.

7. The method according to claim 1, wherein said generated machine code is executable to perform coordinate shading of image primitives.

8. The method according to claim 1, wherein said intermediate representation is an executable representation of said shader source code.

9. The method according to claim 1, wherein said shader source code comprises a vertex shader source code.

10. The method according to claim 1, comprising generating said machine code utilizing a compiler back end.

11. A non-transitory computer-readable medium having stored thereon, a computer program having at least one code section for code processing, the at least one code section being executable by a computer for causing the computer to perform steps comprising:
  generating an intermediate representation of a shader source code, wherein said intermediate representation comprises one or more whole-program data flow graph representations of said shader source code; and
  generating machine code based on said generated intermediate representation of said shader source code.

12. The non-transitory computer-readable medium according to claim 11, wherein said at least one code section comprises code for generating said one or more whole-program data flow graph representations of said shader source code utilizing a compiler front end.

13. The non-transitory computer-readable medium according to claim 11, wherein said generated machine code is executable by a processor comprising a single-instruction multiple-data (SIMD) architecture.

14. The non-transitory computer-readable medium according to claim 11, wherein said generated machine code is executable by a graphics processor comprising a fixed-cycle-pipeline architecture.

15. The non-transitory computer-readable medium according to claim 11, wherein said generated machine code is executable to perform vertex shading of image primitives.

16. The non-transitory computer-readable medium according to claim 11, wherein said generated machine code is executable to perform coordinate shading of image primitives.

17. The non-transitory computer-readable medium according to claim 11, wherein said intermediate representation is an executable representation of said shader source code.

18. The non-transitory computer-readable medium according to claim 11, wherein said shader source code comprises a vertex shader source code.

19. The non-transitory computer-readable medium according to claim 11, wherein said at least one code section comprises code for generating said machine code utilizing a compiler back end.

20. A method for code processing, the method comprising:
  performing by one or more processors:
  generating a whole-program data flow graph representation of a vertex shader source code utilizing a compiler front end; and
  generating in said one or more processors, machine code based on said generated whole-program data flow graph representation utilizing a compiler back end.

* * * * *